United States Patent
Surface (10) Patent No.: US 10,433,671 B2
(45) Date of Patent: Oct. 8, 2019

(54) BEVERAGE DISPENSING MACHINE (71) Applicant: Nicholas James Surface, Lawrence, KS (US)

(72) Inventor: Nicholas James Surface, Lawrence, KS (US)

(*) Notice: Subject to any disclaimer, the term of this patent is extended or adjusted under 35 U.S.C. 154(b) by 161 days.

(21) Appl. No.: 15/466,623

(22) Filed: Mar. 22, 2017

(65) Prior Publication Data
US 2018/0271318 A1 Sep. 27, 2018

(51) Int. Cl.
A47J 31/40 (2006.01)
A47J 31/46 (2006.01)
A47J 31/06 (2006.01)
B67D 1/00 (2006.01)
B67D 1/10 (2006.01)
B67D 1/08 (2006.01)

(52) U.S. Cl.
CPC ......... *A47J 31/462* (2013.01); *A47J 31/0647* (2013.01); *A47J 31/40* (2013.01); *A47J 31/401* (2013.01); *B67D 1/0023* (2013.01); *B67D 1/0039* (2013.01); *B67D 1/0047* (2013.01); *B67D 1/101* (2013.01); *B67D 1/0858* (2013.01); *B67D 1/0869* (2013.01); *B67D 1/0888* (2013.01); *B67D 1/0895* (2013.01); *B67D 2001/0091* (2013.01); *B67D 2210/00099* (2013.01)

(58) Field of Classification Search
CPC .... A47J 31/0647; A47J 31/401; A47J 31/402; A47J 31/404; A47J 31/40; A47J 31/41; A47J 31/50

USPC ... 99/287, 289 R, 323.3, 304, 306, 284, 290
See application file for complete search history.

(56) References Cited

U.S. PATENT DOCUMENTS

| 2,878,968 | A |   | 3/1959  | Burgoyne |              |
|-----------|---|---|---------|----------|--------------|
| 3,064,553 | A | * | 11/1962 | Simjian  | A47J 31/401  |
|           |   |   |         |          | 99/289 R     |
| 3,550,814 | A | * | 12/1970 | von Lersner | A47J 31/401 |
|           |   |   |         |          | 222/129.3    |
| 3,565,641 | A |   | 2/1971  | King     |              |
| 3,671,020 | A |   | 6/1972  | Krup     |              |

(Continued)

FOREIGN PATENT DOCUMENTS

CA  2929276 A1  6/2015
EP  1550391 A1  6/2005

(Continued)

OTHER PUBLICATIONS

International Search Report and Written Opinion dated Jun. 8, 2018 in International Application No. PCT/US2018/023702, 9 pages.

*Primary Examiner* — Reginald Alexander
(74) *Attorney, Agent, or Firm* — Shook, Hardy & Bacon L.L.P.

(57) ABSTRACT

Machines, devices, and methods for generating and dispensing mixed beverages are disclosed. An exemplary beverage machine includes a liquid storage container, an additive ingredient chamber, a mixing chamber, a piston for providing fluid movement into and/or out of the mixing chamber, and a cooling system. The cooling system may be configured to recycle heat rejected from the liquid storage container to provide a heat source for warming a mixed beverage contained in the mixing chamber, in addition to other functions and components.

17 Claims, 10 Drawing Sheets (56) References Cited

U.S. PATENT DOCUMENTS

| | | | | |
|---|---|---|---|---|
| 4,470,999 A | * | 9/1984 | Carpiac | A23F 5/243 |
| | | | | 141/1 |
| 4,595,131 A | | 6/1986 | Ruskin | |
| 4,624,395 A | | 11/1986 | Baron et al. | |
| 4,680,944 A | * | 7/1987 | Menzel | A23G 9/163 |
| | | | | 165/61 |
| 4,993,315 A | * | 2/1991 | Huber | A47J 31/3609 |
| | | | | 100/116 |
| 6,192,785 B1 | * | 2/2001 | Trida | A47J 31/41 |
| | | | | 99/275 |
| 6,202,894 B1 | | 3/2001 | Struminski et al. | |
| 7,252,034 B1 | | 8/2007 | Eckenhausen et al. | |
| 7,607,385 B2 | | 10/2009 | Halliday et al. | |
| 7,762,181 B2 | | 7/2010 | Boland et al. | |
| 8,333,301 B2 | | 12/2012 | Doglioni Majer | |
| 8,444,016 B2 | | 5/2013 | Lussi et al. | |
| 8,661,966 B2 | | 3/2014 | Stearns et al. | |
| 8,985,395 B2 | | 3/2015 | Tansey | |
| 2007/0089611 A1 | | 4/2007 | Coccia et al. | |
| 2008/0233264 A1 | * | 9/2008 | Doglioni Majer | A47J 31/401 |
| | | | | 426/594 |
| 2009/0151574 A1 | * | 6/2009 | Nijboer | A47J 31/40 |
| | | | | 99/282 |
| 2009/0293733 A1 | | 12/2009 | Martin et al. | |
| 2011/0163127 A1 | * | 7/2011 | DiBella-Lenaway | |
| | | | | A47J 31/401 |
| | | | | 222/145.6 |
| 2011/0209624 A1 | * | 9/2011 | Lu | A47J 31/40 |
| | | | | 99/323.3 |
| 2012/0012614 A1 | | 1/2012 | Stuckey et al. | |
| 2015/0135966 A1 | | 5/2015 | Hulett et al. | |
| 2015/0245734 A1 | | 9/2015 | Vogelsang et al. | |
| 2016/0106255 A1 | | 4/2016 | Gordon et al. | |
| 2016/0316961 A1 | | 11/2016 | Midden et al. | |

FOREIGN PATENT DOCUMENTS

| | | |
|---|---|---|
| WO | 0245559 A1 | 6/2002 |
| WO | 2015132135 A1 | 9/2015 |

* cited by examiner

FIG. 20

BEVERAGE DISPENSING MACHINE

TECHNICAL FIELD

The present disclosure relates to machines for dispensing beverages.

BRIEF SUMMARY

A high-level overview is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In brief, and at a high level, this disclosure describes, among other things, machines, devices, and methods for generating and dispensing mixed beverages (e.g., hot chocolate). In one embodiment, a beverage machine is provided that includes a liquid storage container for holding a liquid (e.g., milk), an additive ingredient chamber for storing an additive ingredient (e.g., dry cocoa powder), a mixing chamber, a piston for transferring liquid into the mixing chamber and/or a mixed beverage out of the mixing chamber, and a cooling system for cooling the liquid storage container to maintain its contents at a desired temperature. The cooling system may utilize heat rejected from the liquid storage container to preheat or heat the mixing chamber, and any mixed beverage contained therein, providing greater energy efficiency, among other benefits.

In one exemplary embodiment, a beverage dispensing machine is provided. The beverage dispensing machine comprises a liquid storage container, an additive ingredient chamber, a mixing chamber in fluid communication with the liquid storage container, an additive pump coupled to the additive ingredient chamber for selectively introducing an additive ingredient from the additive ingredient chamber into the mixing chamber, and a piston. The piston is coupled to a linear actuator and to the mixing chamber. The piston comprises a shaft and a plate, the plate located inside the mixing chamber, the piston moveable between a first position and a second position. Movement between the first position and the second position moves the plate within the mixing chamber.

In another exemplary embodiment, a device for mixing beverages is provided. The device comprises a liquid storage container for holding a liquid, an additive ingredient chamber for storing an additive ingredient, and a mixing chamber, the liquid storage container and the mixing chamber in fluid communication. The device further comprises an additive pump coupled to the additive ingredient chamber for selectively introducing the additive ingredient into the mixing chamber, and a cooling system coupled to the liquid storage container and to the mixing chamber, the cooling system comprising a hot side coupled to the mixing chamber, a cold side coupled to the liquid storage container, and a compressor. The cooling system transfers at least a portion of the heat rejected from the liquid storage container to the mixing chamber.

In another exemplary embodiment, a method of manufacturing a beverage mixing machine is provided. The method comprises providing a liquid storage container for holding a liquid, providing an additive ingredient chamber for storing an additive ingredient, and providing a mixing chamber. The method further comprises coupling an additive pump to the additive ingredient chamber for selectively introducing the additive ingredient into the mixing chamber, fluidically coupling the liquid storage container to the mixing chamber, providing a piston coupled to a linear actuator, and coupling the piston to the mixing chamber. The piston comprises a shaft and a plate, the plate located inside the mixing chamber. The piston is moveable between a first position and a second position. Movement between the first position and the second position moves the plate within the mixing chamber.

As used in this disclosure, "liquid" may comprise any drinkable liquid, such as water, milk, non-dairy milk, juice, or another natural, preformed, and/or combination natural and preformed liquid beverage. Further, as used in this disclosure, "additive ingredient" may comprise any ingredient that may be added to a liquid to provide a mixed drinkable beverage, including a dry, semi-dry, and/or liquid ingredient, such as cocoa powder or cocoa paste, for example. The above examples are intended to be exemplary and non-limiting, and additional and alternative liquids and additive ingredients are possible and contemplated herein.

BRIEF DESCRIPTION OF THE DRAWINGS

Exemplary embodiments of the present disclosure are described in detail below with reference to the drawing figures, which are intended to be exemplary and non-limiting in nature, wherein.

DETAILED DESCRIPTION

The subject matter of this disclosure is described with specificity herein to meet statutory requirements. However, the description is not intended to limit the scope hereof. Rather, the claimed subject matter may be embodied in other ways, to include different elements, steps, and/or combinations of elements and/or steps, similar to the ones described in this disclosure, and in conjunction with other present and future technologies. The terms "step" or "block" should not be interpreted as implying any particular order among or between steps or blocks of the methods employed unless and except when the order of individual steps or blocks is explicitly described and required.

At a high level, this disclosure relates to machines for dispensing mixed beverages. An exemplary machine for dispensing mixed beverages may include a liquid storage container, an additive ingredient chamber, a mixing chamber, and a piston. The piston may be used to provide a change in volume within the mixing chamber to facilitate mixing of a liquid and an additive ingredient in the mixing chamber. The machine may further utilize a cooling system for maintaining a desired temperature of the liquid storage container. The cooling system may be configured to allow heat rejected as part of the cooling process to be at least partially directed into the mixing chamber, to reduce or supplement the energy/heat needed to heat or preheat a mixed beverage in the mixing chamber.

The present technology may be embodied as, among other things, a method, a system, and/or a computer-program product. Accordingly, embodiments herein may take the form of a hardware embodiment, or an embodiment combining software and hardware. A computer-program product that includes computer-useable instructions embodied on one or more computer-readable media may also be used. The present technology may further be implemented as hard-coded into the mechanical design of beverage machine components, and/or may be built into an apparatus for producing and dispensing mixed beverages.

Computer-readable media includes volatile media, non-volatile media, removable media, and non-removable media, and also includes media readable by a database, a switch, and/or various other network devices. Network switches, routers, and related components are conventional in nature, as are methods of communicating with the same, so further elaboration is not provided. By way of example, and not limitation, computer-readable media may comprise computer storage media and/or non-transitory communications media.

Computer storage media, or machine readable media, may include media implemented in any method or technology for storing information. Examples of stored information include computer-useable instructions, data structures, program modules, and/or other data representations. Computer storage media may include, but is not limited to, RAM, ROM, EEPROM, flash memory or other memory technology, CD-ROM, digital versatile discs (DVD), holographic media or other optical disc storage, magnetic cassettes, magnetic tape, magnetic disk storage, and/or other magnetic storage devices. These memory components may store data momentarily, temporarily, and/or permanently, and are not limited to the examples provided herein.

Figure 1:
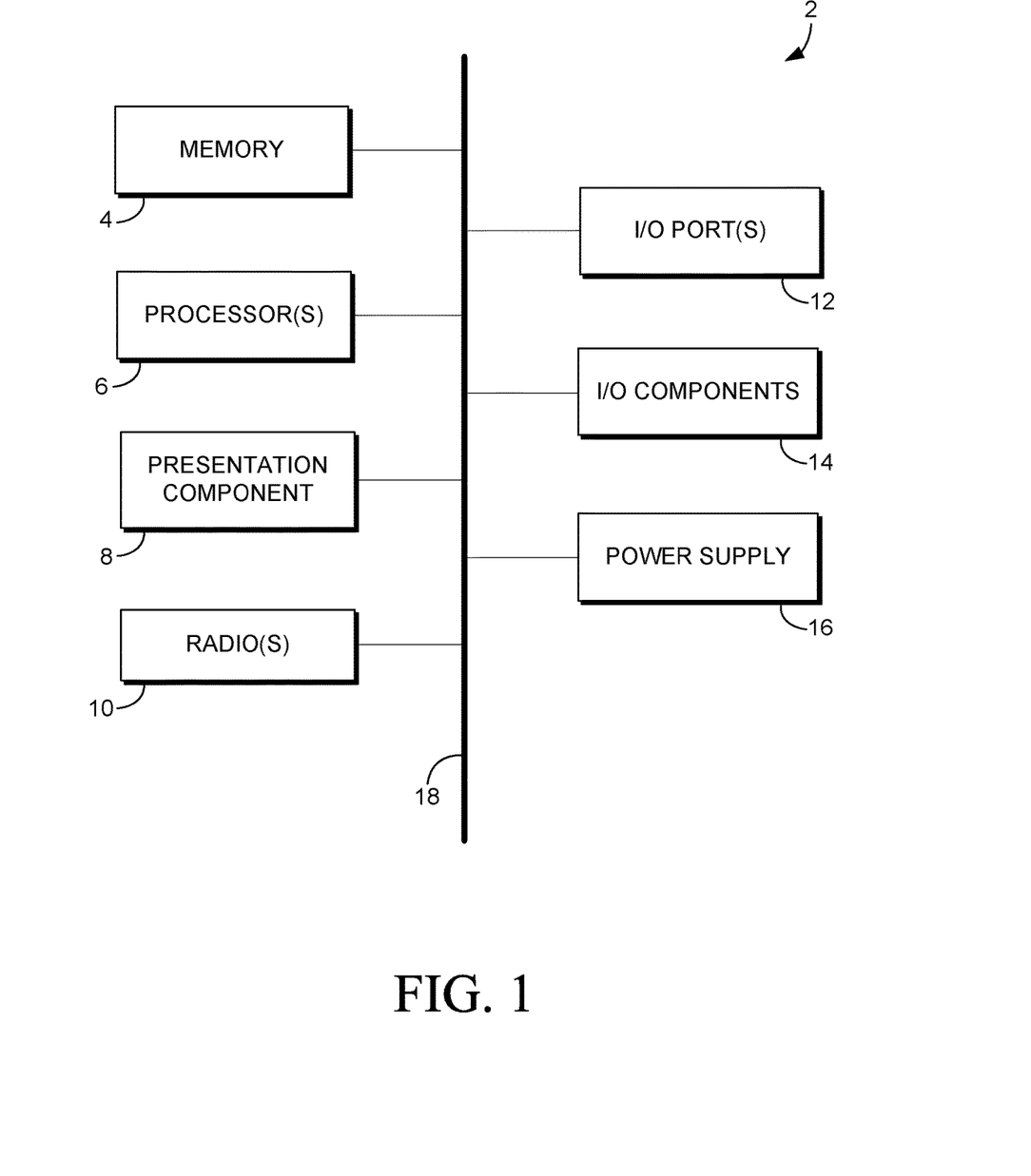
FIG. 1 depicts an exemplary computing environment for use with a mixed beverage dispensing machine, in accordance with an embodiment of the present technology.

Turning now to FIG. 1, a block diagram of an exemplary computing device 2 for use with embodiments of the present technology is provided. It should be noted that although some components depicted in FIG. 1 are shown in the singular, they may be plural. For example, computing device 2 might include multiple processors and/or multiple radios, in a consolidated or distributed configuration. As shown in FIG. 1, computing device 2 includes a bus 18 that may directly or indirectly couple various components together, including, if applicable, memory 4, processor(s) 6, presentation component 8, radio(s) 10, input/output (I/O) port(s) 12, input/output (I/O) components 14, and power supply 16.

Memory 4 may take the form of the memory components described herein. Thus, further elaboration will not be provided, but it should be noted that memory 4 may include any type of tangible medium that is capable of storing information, such as a database. A database may include any collection of records, data, and/or other information. In one embodiment, memory 4 may include a set of embodied computer-executable instructions that, when executed, facilitate various functions or steps disclosed herein. These embodied instructions will variously be referred to as "instructions" or an "application" for short. Processor 6 may actually be multiple processors that receive instructions and process them accordingly. Presentation component 8 may include a display, a speaker, and/or other components that can present information through visual, auditory, and/or other tactile cues (e.g., a display, a screen, a lamp, a light-emitting diode (LED), a graphical user interface (GUI), or even a lighted keyboard).

Radio 10 may facilitate communication with a network, and may additionally or alternatively facilitate other types of wireless communications, such as Wi-Fi, WiMAX, LTE, and/or other VoIP communications. In various embodiments, the radio 10 may be configured to support multiple technologies, and/or multiple radios may be configured and utilized to support multiple technologies.

Input/output (I/O) ports 12 may take a variety of forms. Exemplary I/O ports may include a USB jack, a stereo jack, an infrared port, a firewire port, and/or other proprietary communications ports. Input/output (I/O) components 14 may comprise one or more keyboards, microphones, speakers, touchscreens, and/or any other item usable to directly or indirectly input data into the computing device 2.

Power supply 16 may include batteries, fuel cells, and/or any other component that may act as a power source to supply power to computing device 2 or to other network components, including through one or more electrical connections or couplings. Power supply 16 may be configured to selectively supply power to different components independently and/or concurrently.

Figure 2A:
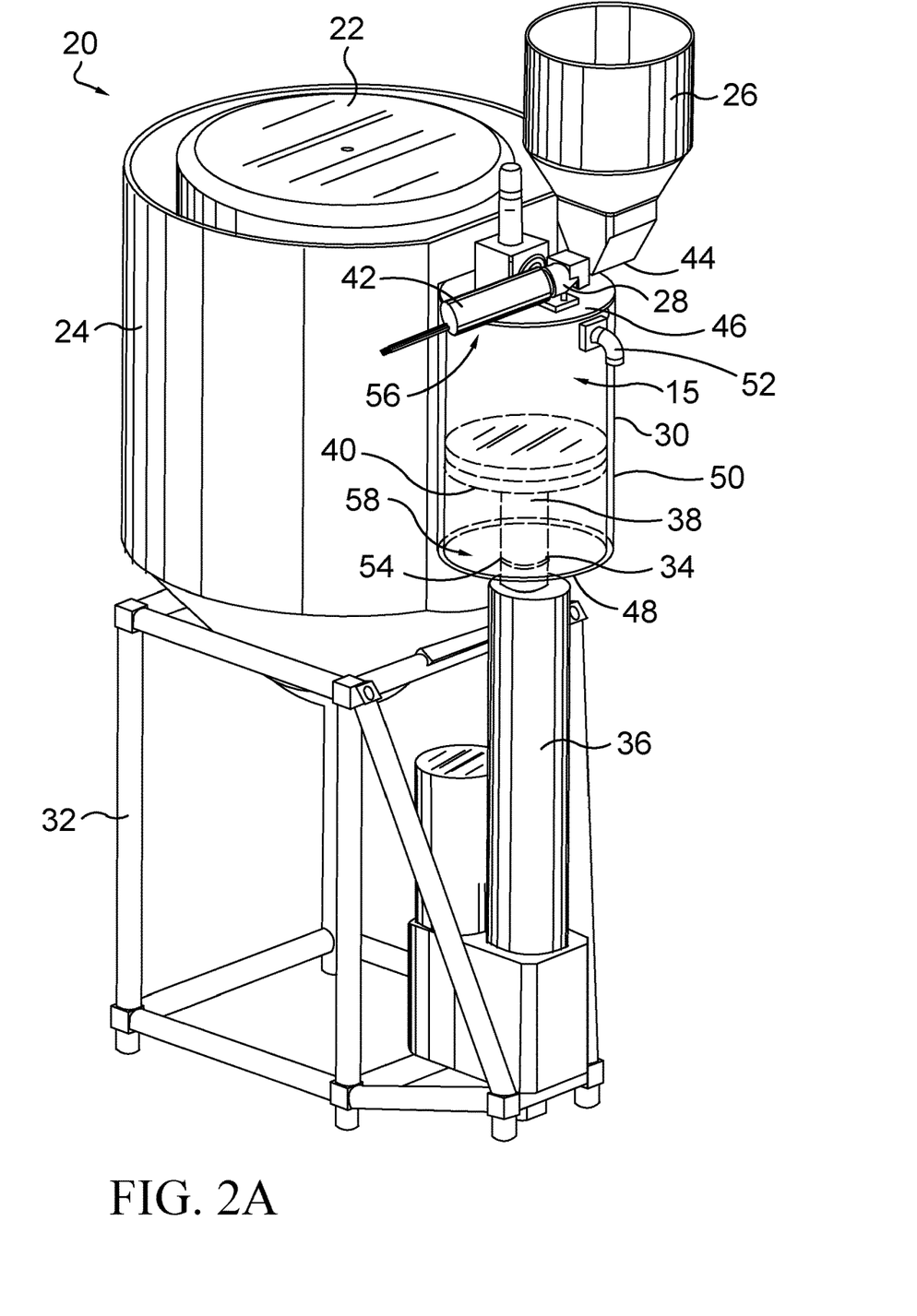
FIG. 2A depicts an exemplary machine for dispensing mixed beverages, in accordance with an embodiment of the present technology.
Figure 2B:
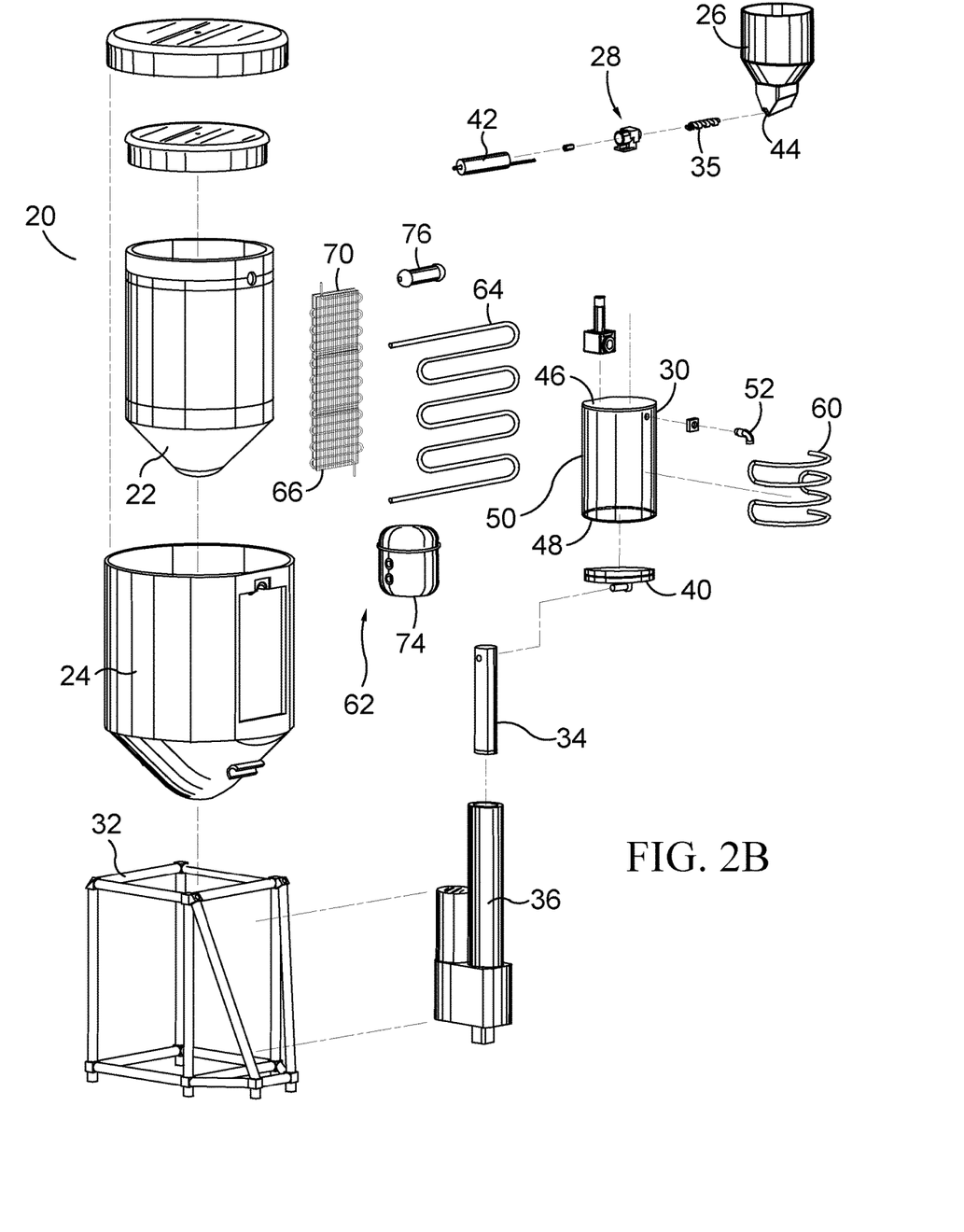
FIG. 2B depicts an exploded view of the machine of FIG. 2A, in accordance with an embodiment of the present technology.

Referring to FIGS. 2A-2B, an exemplary machine 20 for producing and dispensing mixed beverages is provided, in accordance with an embodiment of the present technology. FIG. 2A depicts the machine 20 in assembled form, and FIG. 2B depicts the machine 20 in exploded form. The machine 20 includes a liquid storage container 22, a refrigeration compartment 24, an additive ingredient chamber 26, an additive pump 28, a mixing chamber 30, a support structure 32, and a piston 34. The piston 34 includes a shaft 38 and a plate 40. The piston 34 is coupled to a linear actuator 36 so that the shaft 38 and the associated plate 40 can be moved to control pressure and fluid movement inside the mixing chamber 30. The plate 40 may include an O-ring or other seal to reduce or prevent fluid leakage from the mixing chamber 30. The liquid storage container 22 may be coupled to the mixing chamber 30 through a fluid conduit (not shown; see FIG. 14 for example) so that it can provide a liquid to the mixing chamber 30 during preparation of a mixed beverage.

The additive pump 28 is coupled to the additive ingredient chamber 26 and to the mixing chamber 30, and is configured to introduce an additive ingredient stored in the additive ingredient chamber 26 into the mixing chamber 30 during preparation of a mixed beverage. The additive pump 28 includes an auger 35 coupled to a rotational actuator 42 (shown in FIG. 2B). When assembled, the auger 35 is positioned beneath a bottom funnel-portion 44 of the additive ingredient chamber 26, allowing the auger 35 to capture and transport an additive ingredient into the mixing chamber 30. It should be noted that one or more distinct or integrated additive ingredient chambers, additives, and/or additive pumps may be used with the machine 20 to provide additional options for mixed beverage preparation. As such, the configuration of the machine 20 shown in FIGS. 2A-2B is merely exemplary.

To provide an additive ingredient to the mixing chamber 30, the auger 35 is rotated by the rotational actuator 42, pulling the additive ingredient from the bottom funnel-portion 44 of the additive ingredient chamber 26 and carrying it along the contours of the auger 35 to drop it into the mixing chamber 30. In alternative embodiments, the additive pump 28 may be a moveable cover or other mechanism, which, when actuated, transports or allows passage of the additive ingredient from the additive ingredient chamber 26 into the mixing chamber 30. In a further embodiment, the additive pump 28 may utilize one or more moving or rotating elements (e.g., rotating blade, wheel, agitator, moving blade, and/or scoop) to facilitate movement of the additive ingredient into the mixing chamber 30.

The mixing chamber 30 includes a top portion 46, a bottom portion 48, and one or more sidewalls 50 that extend between the top portion 46 and the bottom portion 48. A fluid outlet 52 is located on the one or more sidewalls 50 for allowing a mixed beverage in the mixing chamber 30 to be dispensed. The piston 34 is located below the mixing chamber 30, and extends upwardly from the linear actuator 36 to the plate 40 located inside the mixing chamber 30. The shaft 38 of the piston 34 extends through an aperture 54 in the bottom portion 48 of the mixing chamber 30. The plate 40 circumscribes a cross-section of the mixing chamber 30 to at least partially provide a seal against the one or more sidewalls 50. In this respect, an adjustable volume 15 is provided within the mixing chamber 30 that is defined by at least the plate 40, the top portion 46 of the mixing chamber 30, and a portion of the one or more sidewalls 50 extending therebetween. The volume 15 is adjustable through movement of the plate 40 in the mixing chamber 30 by the piston 34, which allows drawing, mixing, and dispensing of various ingredients and liquids in the mixing chamber 30. The mixing chamber 30 may further include, in some embodiments, a heating coil 60, as shown in FIG. 2B, that may be used to preheat/heat a mixed beverage in the mixing chamber 30. In FIGS. 2A-2B, the mixing chamber 30 is depicted as circular, but it should be noted that other shapes are contemplated as well (e.g., square, circular, ovular, polygonal, etc.). Furthermore, multiple mixing chambers may be used with the machine 20 or a variant thereof, for providing multiple beverage dispensing units.

As shown in FIG. 2A, the linear actuator 36 is configured to move the piston 34, and also, the plate 40, between a first position 56 and a second position 58. In the first position 56, the plate 40 is located proximate or adjacent to the top portion 46 of the mixing chamber 30. In the second position 58, the plate 40 is located proximate or adjacent to the bottom portion 48 of the mixing chamber 30. Movement of the plate 40 and the piston 34 from the first position 56 to the second position 58 increases the volume 15 inside the mixing chamber 30, and movement of the plate 40 and the piston 34 from the second position 58 to the first position 56 decreases the volume 15 within the mixing chamber.

Figures 16, 17, 18:
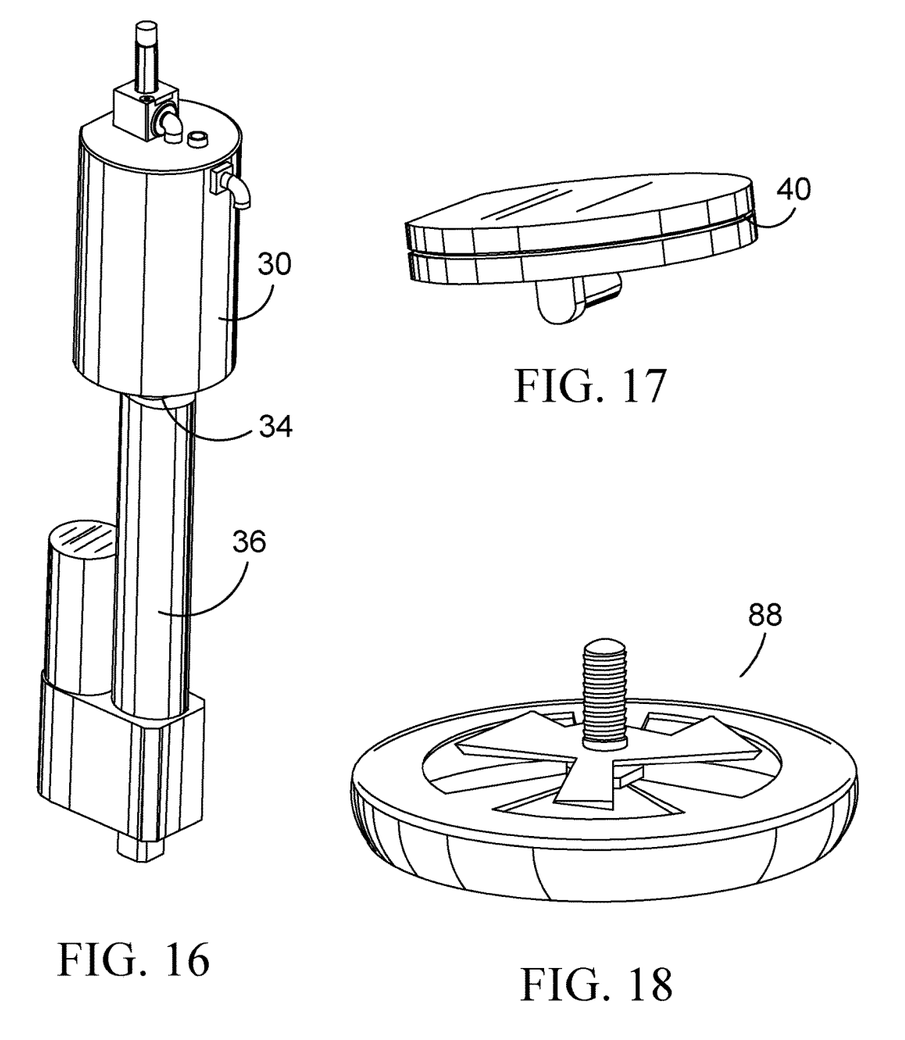
FIG. 16 depicts an exemplary configuration of a piston, a linear actuator, and a mixing chamber, in accordance with an embodiment of the present technology.
FIG. 17 depicts an exemplary plate for a mixing chamber, in accordance with an embodiment of the present technology.
FIG. 18 depicts an exemplary agitator for a mixing chamber, in accordance with an embodiment of the present technology.

In an exemplary operation of the machine 20, the piston 34 is in the first position 56, with the plate 40 located proximate or adjacent the top portion 46 of the mixing chamber 30. The piston 34 may then be moved to the second position 58, such that the plate 40 is located proximate or adjacent the bottom portion 48 of the mixing chamber 30 (FIG. 2A depicts the plate in between). As a result, a pressure differential may be produced within the mixing chamber 30 from the change in the volume 15, which, accordingly, draws liquid from the liquid storage container 22 into the mixing chamber 30. Before, during, and/or after the liquid is drawn into the mixing chamber 30, the additive pump 28 may be activated to introduce the additive ingredient into the mixing chamber 30. Additional mixing may be performed in the mixing chamber 30 by one or more stirring elements, agitators, and/or other mixing devices. An exemplary agitator 88 is depicted in FIG. 18, one or more of which may be located inside the mixing chamber 30.

Referring to FIG. 2B, the machine 20 is depicted in exploded form. FIG. 2B further depicts a cooling system 62, also shown in FIG. 3A, which may be integrated with the refrigeration compartment 24 and used to maintain a desired temperature of the liquid storage container 22, as well as the liquid stored therein. The cooling system 62 includes a cold side 64 and a hot side 66. A compressor 74 and an expansion valve 76 are provided for cycling coolant through the cooling system 62. The hot side 66 further includes a heat exchanger 70 that may be coupled between the liquid storage container 22 and the mixing chamber 30 when the machine 20 is assembled. The positioning of the heat exchanger 70 allows heat expelled from the liquid storage container 22 to be at least partially contained and/or transferred to the mixing chamber 30, which is positioned adjacent the heat exchanger 70. As a result, the rejected heat can be used for preheating/heating a mixed beverage, to better utilize energy generated by the machine 20. Insulation, thermally conductive components, and other elements may also be used to facilitate the transfer of rejected heat into the mixing chamber 30 in the machine 20.

Figure 3A:
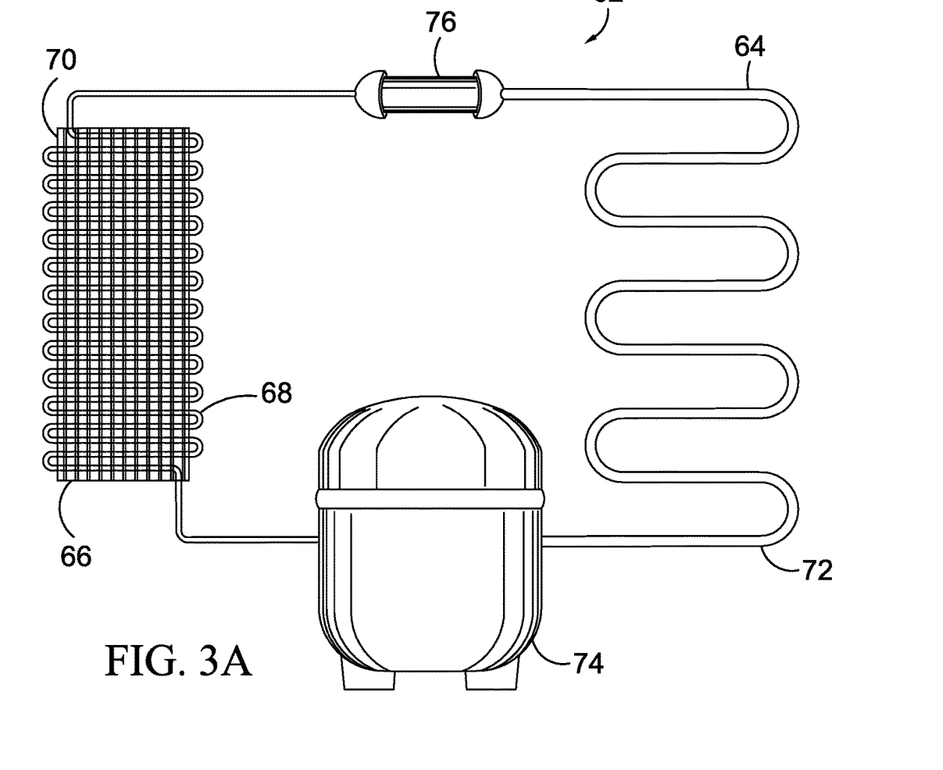
FIG. 3A depicts an exemplary cooling system for use with a mixed beverage dispensing machine, in accordance with an embodiment of the present technology.

Referring to FIG. 3A, the cooling system 62 of FIG. 2B is provided, in accordance with an embodiment of the present technology. As discussed with respect to FIG. 2B, the cooling system 62 includes a cold side 64, which includes one or more evaporator coils 72, and a hot side 66, which includes one or more condenser coils 68 passing through a heat exchanger 70. The hot side 66 and the cold side 64 are coupled to the compressor 74 and to each other through the expansion valve 76. Coolant may be cycled through the cooling system 62, condensing and evaporating, allowing the cooling system 62 to transfer heat out of the refrigeration compartment 24 and at least partially into the mixing chamber 30 of the machine 20 depicted in FIGS. 2A-2B. It should be noted that the cooling system 62 depicted in FIG. 3A is an exemplary and simplified version with a selection of illustrative components, and other configurations and components are contemplated.

Figure 3B:
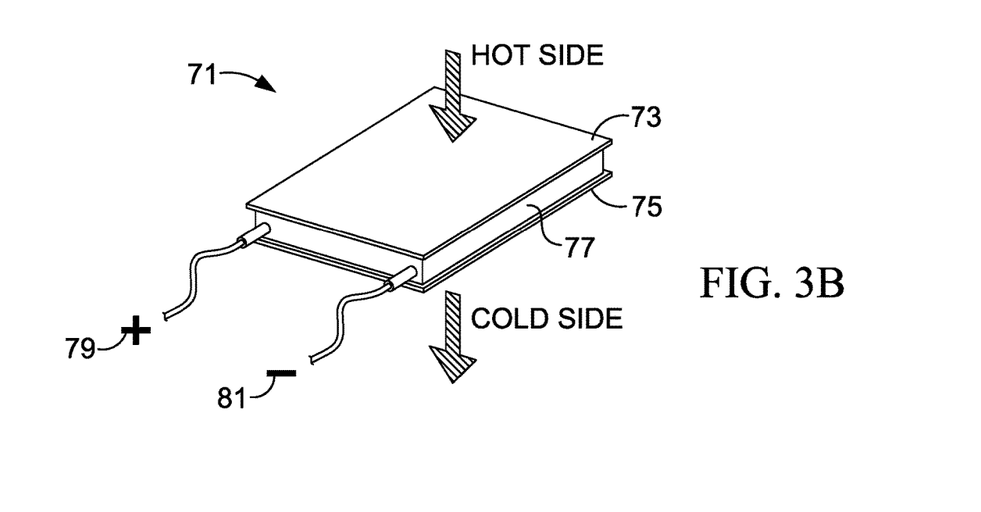
FIG. 3B depicts an exemplary Peltier thermoelectric cooling device for use with a mixed beverage dispensing machine, in accordance with an embodiment of the present technology.

Referring to FIG. 3B, an exemplary Peltier thermoelectric cooling device 71 which may be used with a beverage dispensing machine, such as the machine 20 shown in FIGS. 2A-2B, is provided, in accordance with an embodiment of the present technology. In FIG. 3B, the Peltier thermoelectric cooling device 71 is shown with a first surface 73 providing a hot side and a second surface 75 providing a cold side, the first and second surfaces 73, 75 being separated by a conductive material 77. The Peltier thermoelectric cooling device 71 further includes a positive electrode 79 and a negative electrode 81 that provide an electrical charge through the Peltier thermoelectric cooling device 71. This facilitates heat transfer from the hot side to the cold side to provide a cooling effect (e.g., for a stored liquid in the machine 20). The Peltier thermoelectric cooling device 71 may be used with a beverage dispensing machine, such as the machine 20, in place of the cooling system 62 as an alternative way of providing cooling.

Figure 4:
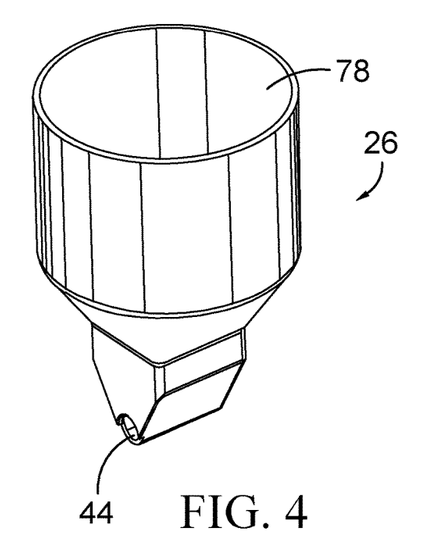
FIG. 4 depicts an exemplary additive ingredient chamber, in accordance with an embodiment of the present technology.
Figure 5:
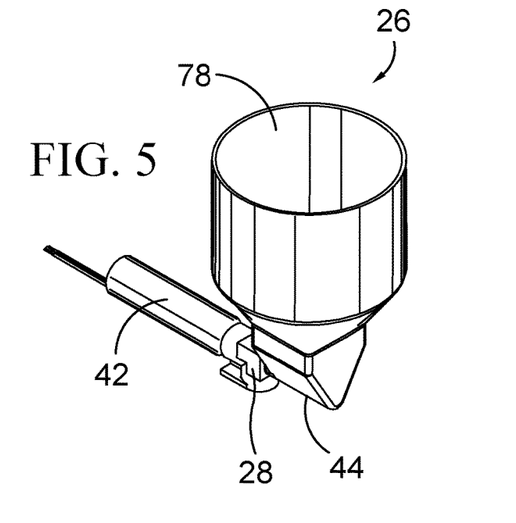
FIG. 5 depicts the additive ingredient chamber of FIG. 4 coupled to an additive pump, in accordance with an embodiment of the present technology.
Figure 6:
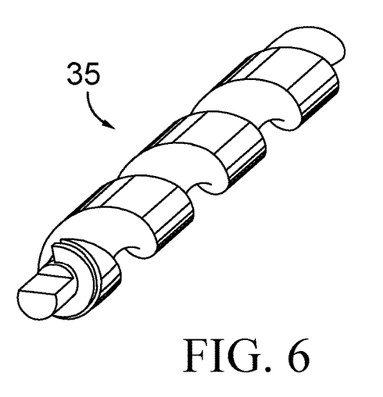
FIG. 6 depicts an exemplary augur which may be used with the additive pump of FIG. 5, in accordance with an embodiment of the present technology.
Figure 7:
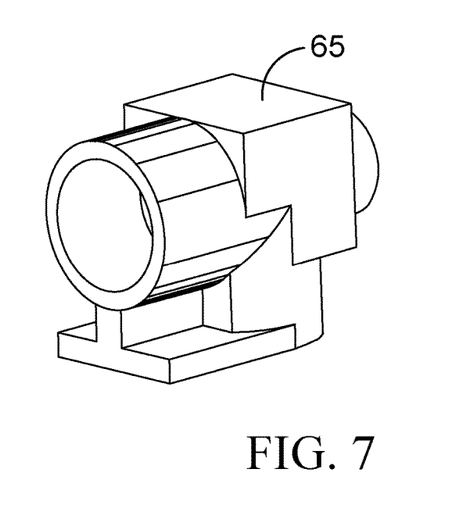
FIG. 7 depicts an exemplary coupling for joining a rotational actuator and an auger, in accordance with an embodiment of the present technology.

Referring to FIG. 4, the additive ingredient chamber 26 of the machine 20 depicted in FIGS. 2A-2B is provided. As discussed in the preceding sections, the additive ingredient chamber 26 may be used to hold an additive ingredient for use in making a mixed beverage. The additive ingredient chamber 26 includes a receptacle portion 78 which funnels downward to the bottom funnel-portion 44, where the additive ingredient may come into contact with the auger 35 of the additive pump 28. As discussed, the rotation of the auger 35 may be used to transfer the additive ingredient out of the additive ingredient chamber 26 and into the mixing chamber 30. Referring to FIG. 5, the additive ingredient chamber 26 is depicted with the additive pump 28 coupled at the bottom funnel-portion 44 along with the rotational actuator 42. The auger 35 shown in FIG. 6 is extending into the bottom funnel-portion 44, where it can extract the additive ingredient. Referring to FIG. 6, the auger 35 is provided depicting the various surface contours. Referring to FIG. 7, a coupling 65 for joining the rotational actuator 42 and the auger 35 together for operation in the machine 20 is provided.

Figure 8:
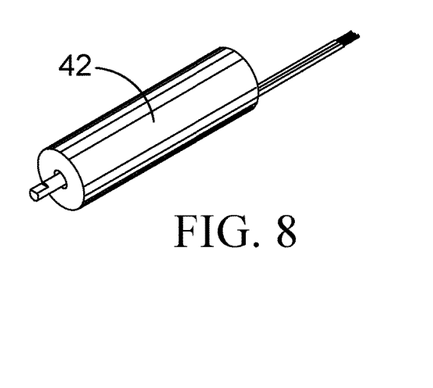
FIG. 8 depicts an exemplary rotational actuator, in accordance with an embodiment of the present technology.
Figure 9:
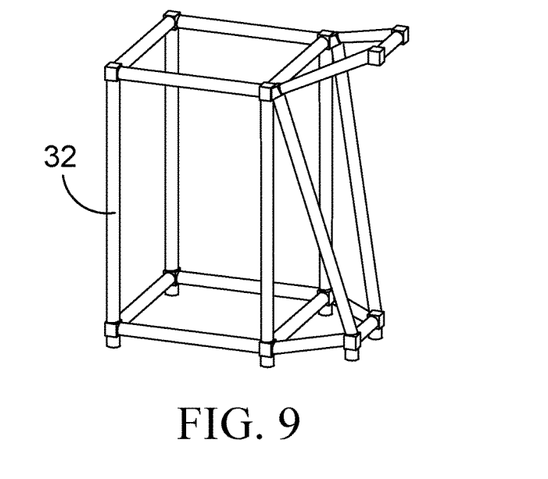
FIG. 9 depicts an exemplary support structure for a mixed beverage dispensing machine, in accordance with an embodiment of the present technology.
Figure 10:
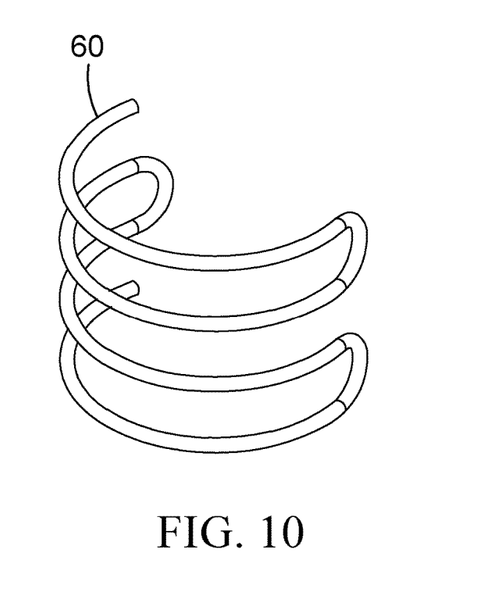
FIG. 10 depicts an exemplary heating coil, in accordance with an embodiment of the present technology.
Figure 11:
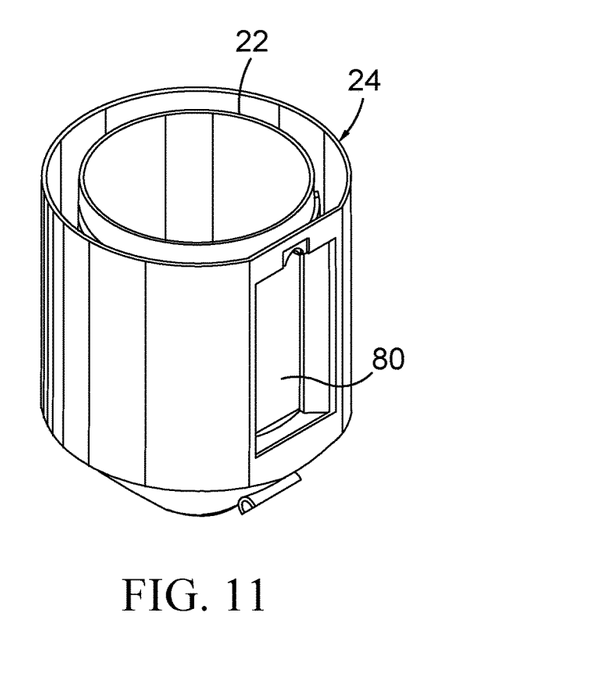
FIG. 11 depicts a liquid storage container and a refrigeration compartment for the same, in accordance with an embodiment of the present technology.

Referring to FIG. 8, the rotational actuator 42 used with the additive pump 28 shown in FIGS. 2A-2B is provided. The rotational actuator 42 may be electrically actuated to provide a rotational force to the auger 35. Referring to FIG. 9, the support structure 32 shown in FIGS. 2A-2B is provided, upon which the machine 20 may be positioned. Referring to FIG. 10, the heating coil 60, which may be electric and which may be coupled to the mixing chamber 30 of the machine 20 to provide additional heating capacity, is provided. Referring to FIG. 11, the liquid storage container 22 and the refrigeration compartment 24 depicted in FIGS. 2A-2B are again shown. FIG. 11 further depicts a location 80 at which the heat exchanger 70 may be positioned to facilitate transfer of heat from the refrigeration compartment 24 to the mixing chamber 30.

Figure 12:
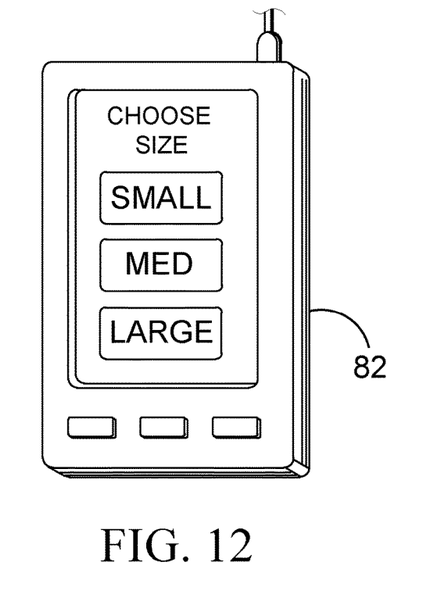
FIG. 12 depicts an exemplary control interface for a mixed beverage dispensing machine, in accordance with an embodiment of the present technology.

Referring to FIG. 12, an exemplary control interface 82, which may be a graphical user interface (GUI) communicatively coupled to a mixed beverage dispensing machine, such as the machine 20 shown in FIGS. 2A-2B, is provided, in accordance with an embodiment of the present technology. The control interface 82 may include an electronic display, buttons, visual, auditory, and/or other interactive components, and may be configured to control a cooling system, such as the cooling system 62 shown in FIG. 3A, an additive pump, such as the additive pump 28 shown in FIGS. 2A-2B, and/or a piston, such as the piston 34 shown in FIGS. 2A-2B, in addition to other components associated with a mixed beverage dispensing machine, to facilitate mixing and dispensing of a mixed beverage. The control interface 82 may allow a user to control such things as beverage contents, beverage temperature, beverage size (volume of beverage prepared), and/or dispensing of a mixed beverage, among other possible options.

Figure 13:
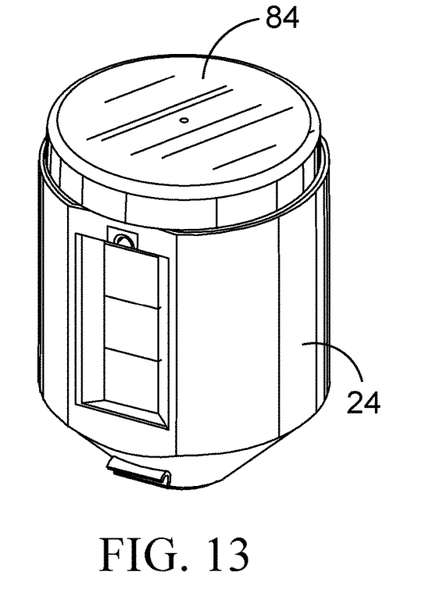
FIG. 13 depicts an exemplary refrigeration compartment, in accordance with an embodiment of the present technology.
Figure 14:
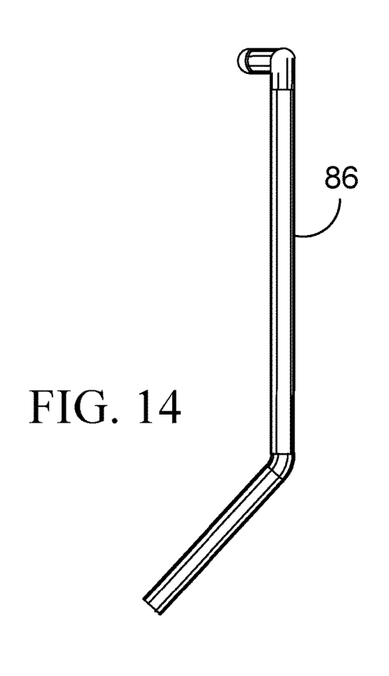
FIG. 14 depicts an exemplary fluid conduit, in accordance with an embodiment of the present technology.
Figure 15:
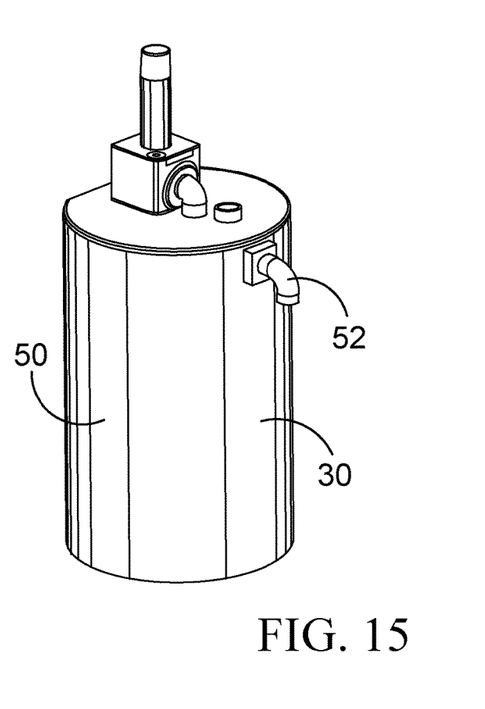
FIG. 15 depicts an exemplary mixing chamber, in accordance with an embodiment of the present technology.
Figure 19:
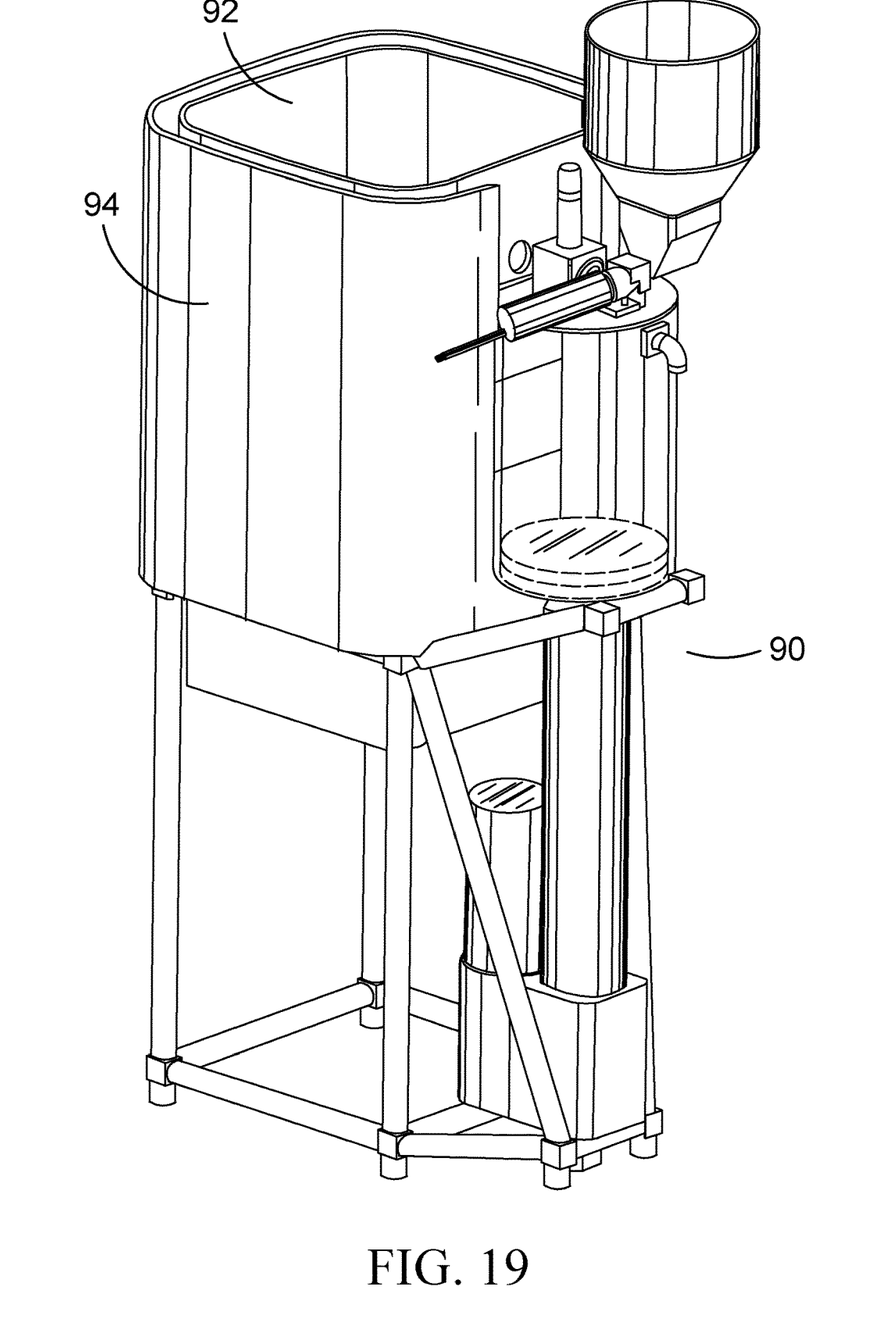
FIG. 19 depicts an alternate embodiment of a mixed beverage dispensing machine, in accordance with an embodiment of the present technology.

Referring to FIG. 13, the refrigeration compartment 24 of the machine 20 shown in FIGS. 2A-2B is provided, with a cover 84 secured to the top of the refrigeration compartment 24. Referring to FIG. 14, an exemplary fluid conduit 86 (e.g., pipe or tube) is provided that may be used to transfer liquid from a liquid storage container, such as the liquid storage container 22 shown in FIGS. 2A-2B, to a mixing chamber, such as the mixing chamber 30 shown in FIGS. 2A-2B. Referring to FIG. 15, an exterior view of the mixing chamber 30 of the machine 20 depicted in FIGS. 2A-2B is provided, showing the positioning of the fluid outlet 52 on the one or more sidewalls 50 of the mixing chamber 30. Referring to FIG. 16, the linear actuator 36, piston 34, and mixing chamber 30 depicted in FIGS. 2A-2B are provided in assembled form. Referring to FIG. 17, the plate 40 of FIGS. 2A-2B, which can be moved within the mixing chamber 30 of the machine 20, is provided. Referring to FIG. 18, an exemplary agitator 88 for mixing liquids and additive ingredients within the mixing chamber 30 of the machine 20 is provided. Referring to FIG. 19, a mixed beverage dispensing machine 90 with an alternative configuration is provided, in accordance with an embodiment of the present technology. The machine 90 shown in FIG. 19 includes a liquid storage container 92 and a refrigeration compartment 94 that are generally square or rectangular in shape.

Figure 20:
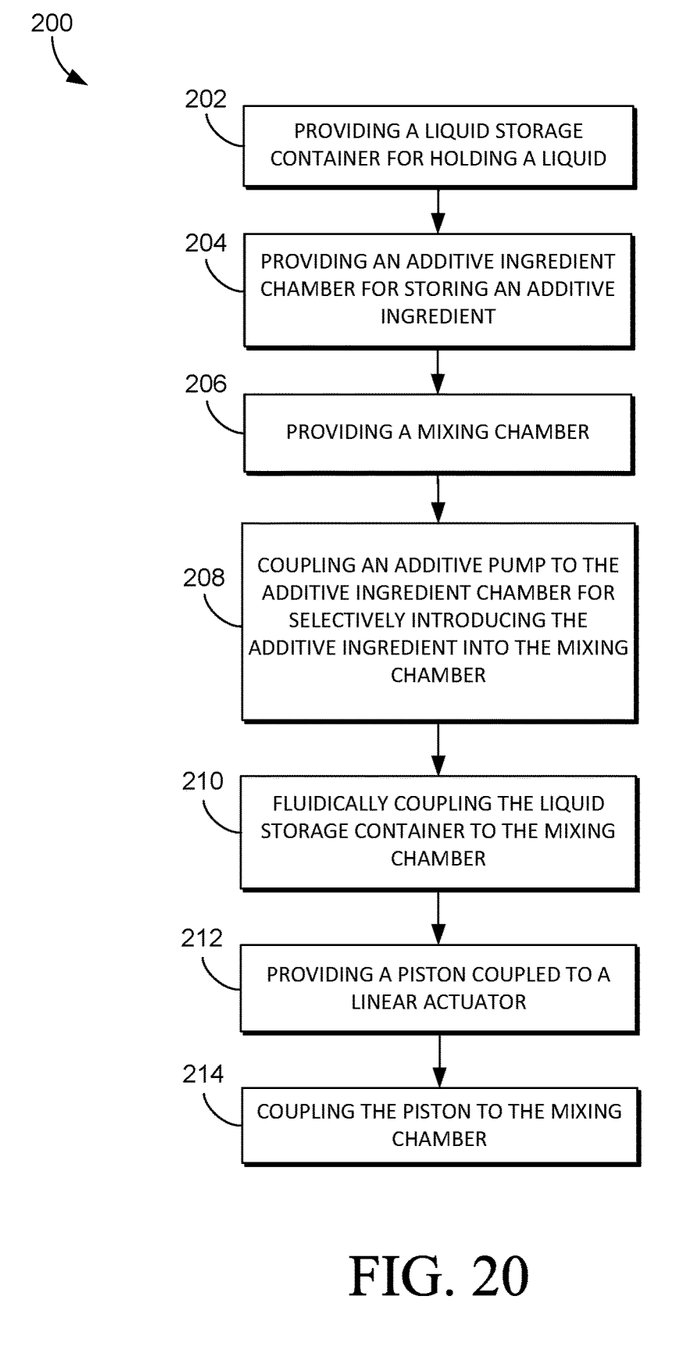
FIG. 20 depicts a block diagram of an exemplary method of manufacturing a beverage mixing machine, in accordance with an embodiment of the present technology.

Referring to FIG. 20, a block diagram of an exemplary method 200 of manufacturing a machine for dispensing mixed beverages is provided, in accordance with an embodiment of the present technology. At a block 202, a liquid storage container, such as the liquid storage container 22 shown in FIGS. 2A-2B, for holding a liquid, such as milk or water, is provided. At a block 204, an additive ingredient chamber, such as the additive ingredient chamber 26 shown in FIGS. 2A-2B, for storing an additive ingredient, such as powdered cocoa, is provided. At a block 206, a mixing chamber, such as the mixing chamber 30 shown in FIGS. 2A-2B, is provided. At a block 208, an additive pump, such as the additive pump 28 shown in FIGS. 2A-2B, is coupled to the additive ingredient chamber for selectively introducing an additive ingredient into the mixing chamber.

At a block 210, the liquid storage container is fluidically coupled to the mixing chamber, such as using the fluid conduit 86 shown in FIG. 14. At a block 212, a piston, such as the piston 34 shown in FIGS. 2A-2B, coupled to a linear actuator, such as the linear actuator 36 shown in FIGS.

2A-2B, is provided. At a block 214, the piston is coupled to the mixing chamber. The piston may comprise a shaft, such as the shaft 38 shown in FIG. 2A, and a plate, such as the plate 40 shown in FIG. 2A, the piston being movable between a first position, such as the first position 56 shown in FIG. 2A, and a second position, such as the second position 58 shown in FIG. 2A. Movement between the first position and the second position moves the plate within the mixing chamber.

From the foregoing, it will be seen that the technology is one well adapted to attain all the ends and objects hereinabove set forth together with other advantages, which are obvious and which are inherent to the structure. It will be understood that certain features and sub-combinations are of utility and may be employed without reference to other features and sub-combinations. This is contemplated by and is within the scope of the claims.

What is claimed is:

1. A beverage dispensing machine, comprising:
   a liquid storage container;
   an additive ingredient chamber;
   a mixing chamber in fluid communication with the liquid storage container;
   an additive pump coupled to the additive ingredient chamber for selectively introducing an additive ingredient from the additive ingredient chamber into the mixing chamber;
   a piston,
   the piston coupled to a linear actuator and to the mixing chamber,
   the piston comprising a shaft and a plate, the plate located inside the mixing chamber, and
   the piston moveable between a first position and a second position, wherein movement between the first position and the second position moves the plate within the mixing chamber; and
   a cooling system having a hot side and a cold side, the hot side comprising a heat exchanger coupled between the liquid storage container and the mixing chamber.

2. The machine of claim 1, wherein movement from the first position to the second position moves the plate within the mixing chamber to increase a volume within the mixing chamber, and wherein movement from the second position to the first position moves the plate within the mixing chamber to decrease the volume within the mixing chamber.

3. The machine of claim 2, wherein the piston extends through a bottom portion of the mixing chamber, and wherein the volume is defined between the plate, a top portion of the mixing chamber, and at least a portion of one or more sidewalls of the mixing chamber.

4. The machine of claim 1, wherein the additive ingredient chamber and the additive pump are located at least partially on a top portion of the mixing chamber, and wherein the mixing chamber further comprises a fluid outlet.

5. The machine of claim 1, wherein the additive pump further comprises an auger and a rotational actuator that are coupled to each other, wherein the rotational actuator is configured to rotate the auger to draw the additive ingredient into the mixing chamber from the additive ingredient chamber.

6. The machine of claim 1, further comprising a fluid conduit coupled between the liquid storage container and the mixing chamber for providing fluid communication therebetween.

7. The machine of claim 1, further comprising a control interface communicatively coupled to the linear actuator and to the additive pump.

8. A device for mixing beverages, comprising:
   a liquid storage container for holding a liquid;
   an additive ingredient chamber for storing an additive ingredient;
   a mixing chamber, the liquid storage container and the mixing chamber in fluid communication;
   an additive pump coupled to the additive ingredient chamber for selectively introducing the additive ingredient into the mixing chamber; and
   a cooling system coupled to the liquid storage container and to the mixing chamber, the cooling system comprising:
   a hot side coupled to the mixing chamber,
   a cold side coupled to the liquid storage container, and
   a compressor,
   wherein the cooling system transfers at least a portion of the heat rejected from the liquid storage container to the mixing chamber.

9. The device of claim 8, wherein the cooling system comprises a refrigerated compartment for the liquid storage container and a heat exchanger, the heat exchanger coupled between the liquid storage container and the mixing chamber.

10. The device of claim 8, wherein the hot side comprises one or more evaporator coils, the cold side comprises one or more condenser coils, and the hot side and the cold side are coupled together with an expansion valve.

11. The device of claim 8, further comprising a linear actuator and a piston movably coupled thereto, the piston extending through the mixing chamber to a plate located within the mixing chamber, the piston moveable between a first position and a second position.

12. The device of claim 11, further comprising:
    an electric heating coil coupled to the mixing chamber;
    an agitator coupled internal to the mixing chamber;
    a control interface communicatively coupled to the linear actuator and to the additive pump; and
    a fluid outlet coupled to the mixing chamber.

13. A method of manufacturing a beverage mixing machine, the method comprising:
    providing a liquid storage container for holding a liquid;
    providing an additive ingredient chamber for storing an additive ingredient;
    providing a mixing chamber;
    coupling an additive pump to the additive ingredient chamber for selectively introducing the additive ingredient into the mixing chamber;
    fluidically coupling the liquid storage container to the mixing chamber;
    providing a piston coupled to a linear actuator, the piston comprising a shaft and a plate;
    coupling the piston to the mixing chamber so that the plate is located inside the mixing chamber; and
    moving the piston from a first position to a second position to draw the liquid into the mixing chamber from the liquid storage container,
    wherein movement between the first position and the second position moves the plate within the mixing chamber.

14. The method of claim 13, further comprising providing a cooling system comprising a refrigeration chamber in which the liquid storage container is enclosed, the cooling system comprising:
    a compressor;
    a hot side comprising one or more evaporator coils coupled to a heat exchanger;
    a cold side comprising one or more condenser coils; and an expansion valve coupled between the hot side and the cold side, wherein the heat exchanger is coupled between the liquid storage container and the mixing chamber for transferring heat therebetween.

15. The method of claim 13, wherein the piston extends through a bottom portion of the mixing chamber, and wherein the piston positions the plate proximate a top portion of the mixing chamber in the first position and positions the plate proximate the bottom portion of the mixing chamber in the second position.

16. The method of claim 13, wherein the additive pump further comprises an auger and a rotational actuator that are rotatably coupled together, the rotational actuator configured to rotate the auger to draw the additive ingredient into the mixing chamber from the additive ingredient chamber.

17. The method of claim 13, further comprising providing a control interface, the control interface operable to control at least one of:

cooling of the liquid storage container;
movement of the additive ingredient by the additive pump; and
movement of the piston.

* * * * *